J. F. CULLEN.
SPOOLING MACHINE.
APPLICATION FILED MAY 9, 1921.
1,418,365.
Patented June 6, 1922.
2 SHEETS—SHEET 1.
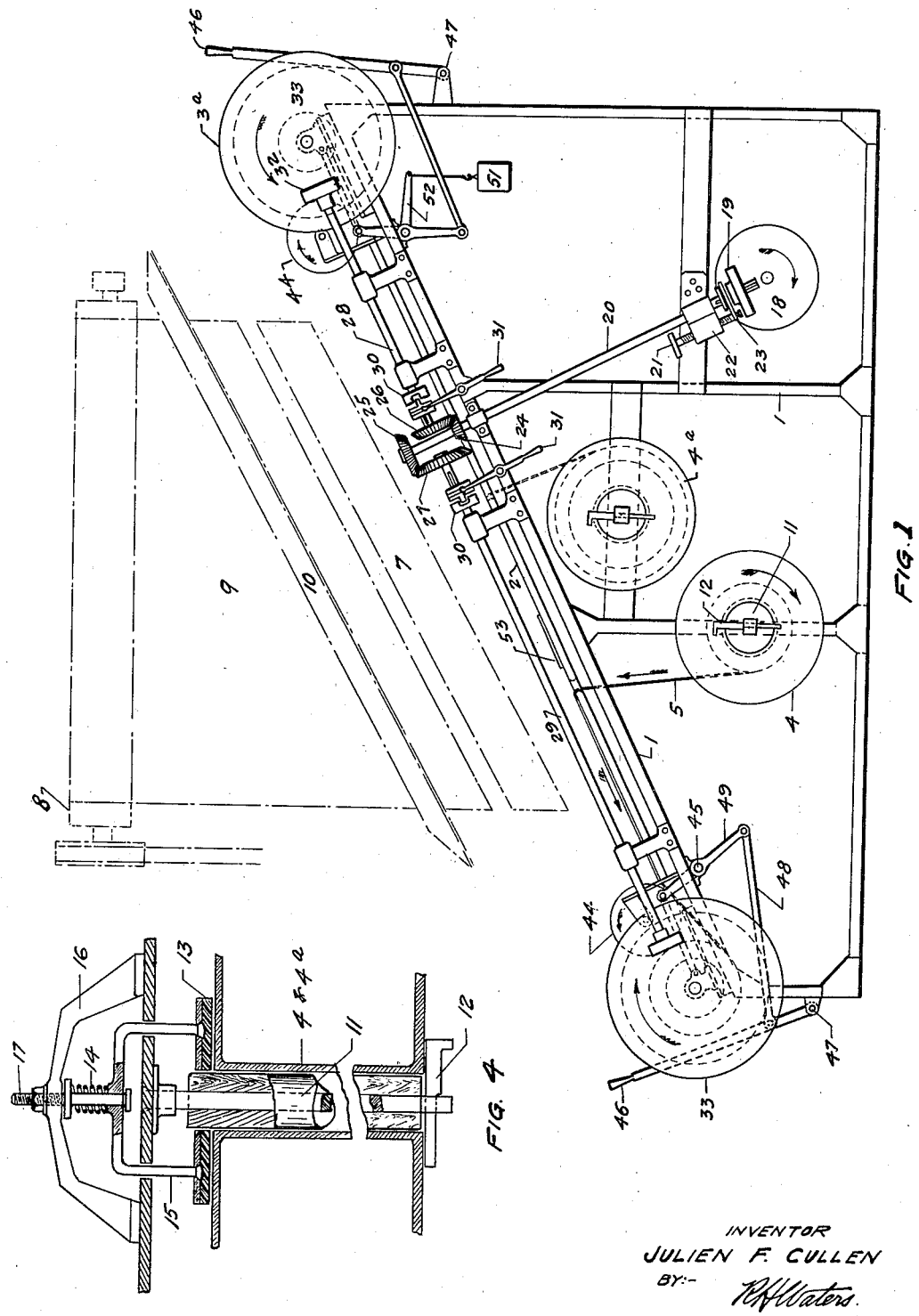
INVENTOR
JULIEN F. CULLEN
BY:- R H Waters
ATTORNEY.

J. F. CULLEN.
SPOOLING MACHINE.
APPLICATION FILED MAY 9, 1921.
1,418,365.
Patented June 6, 1922.
2 SHEETS—SHEET 2.
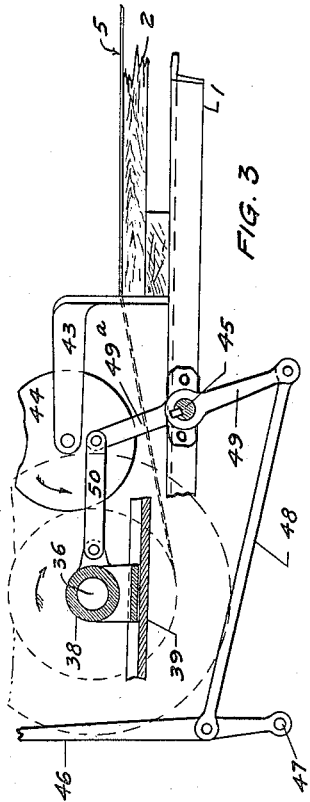
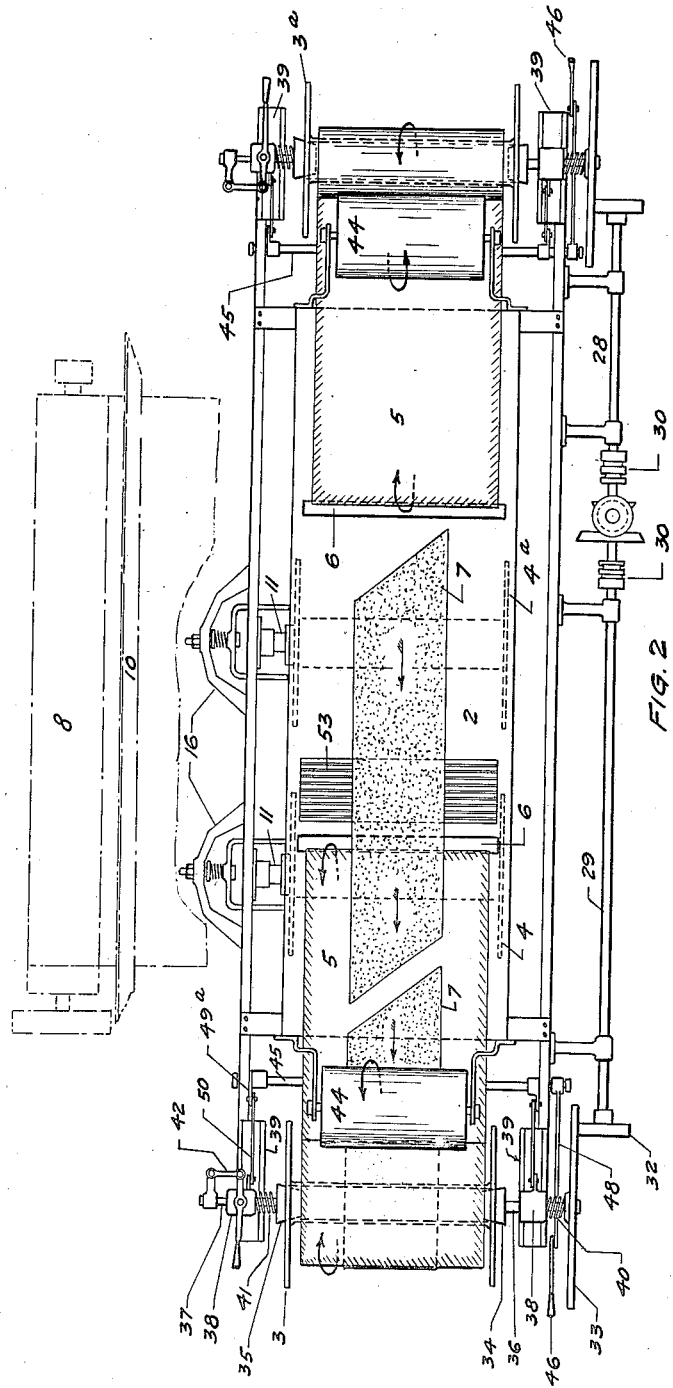
INVENTOR
JULIEN F. CULLEN
BY:-
R H Waters
ATTORNEY

UNITED STATES PATENT OFFICE.

JULIEN F. CULLEN, OF CUMBERLAND, MARYLAND, ASSIGNOR TO KELLY-SPRING-FIELD TIRE COMPANY, OF CUMBERLAND, MARYLAND, A CORPORATION OF NEW JERSEY.

SPOOLING MACHINE.

1,418,365.        Specification of Letters Patent.        Patented June 6, 1922.

Application filed May 9, 1921. Serial No. 467,939.

*To all whom it may concern:*

Be it known that I, JULIEN F. CULLEN, a citizen of the United States, residing at Cumberland, in the county of Allegany and State of Maryland, have invented certain new and useful Improvements in a Spooling Machine, of which the following is a specification.

My invention relates to the art of reeling strips of sticky material, such as are used in the manufacture of pneumatic tire casings. These strips of material, being coated with an exceedingly adhesive substance, require great skill in their handling to prevent their becoming creased or folded upon themselves or contacting with each other. It is the usual practice to cut these pieces from stock rolls and to reel the strips thus cut upon spools, the custom being to place them in spaced apart relation upon a cloth conveyor which is reeled upon a spool in a manner to interpose a layer of cloth between adjacent strips.

In the process of spooling the cloth conveyor with its gummy strips, great care must be exercised that the conveyor run smooth and taut upon the spool and that there be no scuffing-up or wrinkling of the gummy material thereon. It is therefore an object of the present invention to provide a drive mechanism for the spool that will be positive and which will avoid the application of the driving means upon the face of the rolled up conveyor cloth and at the same time maintain a constant tension on the cloth as it is spooled.

As the rate of wind up should be of uniform speed, to correspond with the rated cut off of the machine supplying the gummy strips, it has been made a further object of this invention to provide for the maintenance of a uniform rate of take up of the conveyor by the introduction of an automatically operated speed control of the spool winding mechanism controlled by the rate of diametrical increase of the cloth conveyor upon the spool.

The usual form of device for performing the spooling operation referred to, comprises, essentially, two spools or reels, the supply spool on which the conveyor is wrapped empty, and the receiving spool which gradually draws about its spindle the conveyor cloth from that first mentioned; the gummy strips being laid upon the moving conveyor in an appropriate manner. The usual spooling device is combined with a horizontal table designed for use adjacent a horizontal cutting table, which supplies the cut strips to be spooled, and the mechanism thereof is particularly adapted to operate with the table horizontal. Recently a new form of strip cutter known as a vertical bias cutter, has come into use wherein the fabric from which the strips are cut is passed over a horizontal roller high above the floor line and the down-coming edge is cut into appropriate strips within the blades of a diagonally disposed knife. The present invention is particularly adapted to work in combination with this vertical bias cutter, and one of the objects thereof is to so arrange the angular direction of the table and to so so design the mechanical features connected therewith as to render the device effective when operated in the position shown, that is, with the angle of the table in substantial conformity with that of the knife element of the cutter.

To the attainment of these and other useful objects, herein appearing, this invention consists in the new and useful combination of features more fully hereinafter described, illustrated in the drawings and specifically claimed.

An illustrative embodiment of this invention is shown in the accompanying drawings, in which:

Figure 1, is a side elevation of the device, particularly showing, in dotted lines, the relative position of the knife of the cutter machine from which the strips of material to be reeled are derived. A severed strip is shown descending upon the table.

Figure 2 is a top view, showing also, in dotted lines, the relative position of the juxtaposed cutter machine.

Figure 3 is a diagrammatic illustration of a part of the gearing for automatically diminishing the speed of the receiving spool as the winding progresses.

Figure 4 is a sectional view of the supply spool, showing its mounting and braking appliance.

In the detailed disclosure by drawings, in which like numerals of reference denote corresponding parts, the frame 1, of any suitable material and form, supports the receiving table 2, at the opposed ends of which are shown the receiving spools 3 and 3ª, below the table are the corresponding supply spools 4 and 4ª. The conveyor 5 is wound empty upon spools 4 and 4ª and led up through slots 6 in the table to the respective receiving spools. In Figure 2, the gummy strips 7 are shown being drawn onto the conveyor related to spool 3. The vertical bias cutter machine is indicated generally by 8, the uncut fabric by 9, and the angularly disposed knife element by 10.

The supply spools are revolubly mounted on fixed bearings 11, rigidly attached to the frame 1 below the table, and retained thereon by suitable pins 12. In order that suitable tension may be maintained on the conveyor 5, an adjustable friction brake is provided on each supply spool, comprising a friction disk 13, pressed into contact with the end of the spool by a spring 14, reacting on a suitable spreader 15, the whole being retained by a yoke 16, through which a spring controller 17 protrudes. (See Fig. 4).

Rotation of the respective receiving spools is effected through a transmission system originating with a constant speed disk 18, driven by any suitable source of power. Contacting with disk 18 is a friction wheel 19, slidably keyed to the shaft 20. A variable rate of revolution of shaft 20 is provided by means for radially adjusting the friction wheel 19 on the face of disk 18; this selective speed being attained by manipulating the floating wheel 19 by a hand screw 21, suitably journaled in a bearing and screw block 22, and attached to the collar 23, revolubly associated with the hub of the wheel 19. At the upper end of 20 and keyed thereto, are a pair of bevel gears 24 and 25, meshing with complementary gears 26 and 27. Gear 26 drives shaft 28 eventually actuating spool 3ª, and 27 the shaft 29 actuating spool 3. Between gears 26 and 27 and their respective shafts are counterpart clutches 30, each independently thrown by suitable levers 31. These clutches are so arranged that either receiving spool may be operated independently, or they may be in gear simultaneously.

As the related gearing for both spools 3 and 3ª is identical, similar numerals of reference apply to corresponding elements of each. At the extremities of shafts 28 and 29 are friction wheels 32, engaging the respective faces of friction disks 33. The disks 33 effect revolution of the respective spools in a manner hereafter described.

The spools 3 and 3ª are removably mounted on independent cone-shaped centers; 34 is known as the driving center and 35 the retaining center. 34 is keyed to the end of the shaft 36 which is non-rotatably associated with disk 33. Center 35 is revolubly retained on the end of shaft 37. Both shafts 36 and 37 are suitably journaled in parallel alinement within substantially counterpart bearings 38, which are slidably mounted within guides 39, as presently explained.

(See Figs. 2 and 3). Disk 33 is spring-pressed at 40 against friction wheel 32. Centering cone 35 is rotatably mounted on its shaft 37 and spring-pressed into the open spindle of the receiving spool at 41. In order that the spool may be readily mounted on and released from its centers, a parallel motion lever system 42 (see Fig. 2), has been provided to manipulate center 35.

The following gearing is provided to maintain a uniform take-up speed on the conveyor: Fixed in suitable hangers 43 on the ends of table 2 and juxtaposed to the spools 3 and 3ª are idler rolls 44, faced with a suitable material and adapted to contact with the rolled-up conveyor cloth on the spools. When the receiving spool is ready to commence taking up the conveyor cloth, (see Fig. 2—right hand end), that is, after a few turns of the cloth have been made about its spindle, the spool is advanced within the slides 39 until contact is had between the rolled-up conveyor and the idler 44. Manual advance of the spool into contact with 44 is effected by oscillation of the rocker shaft 45 (see Fig. 3) by means of a lever 46, fulcrumed at 47 on the frame 1. Attached to 46 and above its fulcrum, is a link 48, in turn attached to an arm 49, which is non-rotatably keyed to the end of 45. It will thus be seen that a movement of lever 46 will result in imparting a partial rotation to shaft 45. Shaft 45 is rotatably journaled at each end on the frame 1. Sliding of the spool bearings 38 within their guides 39 is associated with oscillation of the rocker shaft 45 through arms 49ª keyed thereto and supporting at their face ends links 50, said links in turn being suitably pinned to extensions on either of the bearings 38. As each bearing 38 is separately linked to the rocker shaft, as described, parallelism of motion therebetween is assured. Contact once having been made between the face of the wound-up conveyor on the spool and the idler roll 44, it will be seen that, as the diameter of the spool winding increases, the contacting circumference thereof with the interfering roll 44 will cause the spool with its associated gearing to progressively recede (Fig. 2, left hand end—see Fig. 3). As this recession takes place the friction disk 33 will cause the relative radial position of the driving wheel 32 to change, thus progressively reducing the rate of revolution in true ratio to the peripheral speed of winding, thereby automatically maintaining a uniform take up speed.

In order to overcome the tendency of the upper spool 3ª to slide down within its guides 39, due to gravity, and the back pull of the conveyor, a counter weight 51 is provided on an arm 52, which is suitably attached to an intermediate portion of the rocker shaft 45. The lower spool 3 has the counteracting pull of the conveyor to overcome its tendency to slide down within its bearings and does not require the above described counter weight.

The angle of the table being rather steep it has been found advantageous to provide a drag strip 53, just above the lower opening in the table, and so located with respect to the oncoming conveyor, that a gummy strip 7, will, of necessity, pass over said strip and be retarded in its movement as it is drawn forward by reason of the pull exerted on its portion overlapping the conveyor. This retardation effects a straightening out of all casual inequalities in the strip 7 and insures its smooth reeling. The strip 53 is preferably of corrugated rubber, or like material.

Treating briefly the operation of the device: It will be noted that the machine is, in effect, two independent spooling devices. Either end may be used while the other is idle, or both winding spools may operate simultaneously. In practice one end is used while the other is having a fully wound spool removed and a fresh supply spool set below the table; in this way insuring of an uninterrupted supply from the cutter and its continuous operation.

When preparing to start, an empty receiving spool is centered, a full supply spool is placed upon its bearing and the free end of the conveyor threaded up through the slot in the table and made fast to the spindle of the receiving spool, then a few turns of the latter are effected to start the conveyor true, after which the tension on the conveyor is set by manipulating the drag on the supply spool. After setting-up the conveyor the initial winding, or uptake, speed of the conveyor is determined in relation to the cutting off speed of the gummy strip supply machine; the speed of uptake being initially set by adjusting the main friction wheel 19 radially on the face of the drive disk 18 (see Fig. 1). Now the spool 3 or 3ª, as the case may be, is advanced by its previously described hand lever system until the face of the conveyor, wound on the spool, is in contact with the idler roll 44, which final adjustment places the machine in operating condition. As the falling strips 7 are caught and reeled by the conveyor the increasing diameter of winding upon the receiving spool will cause that member, through contact with the idler 44, to gradually recede toward the end of its parallel bearing slides, effecting thereby a shifting of the spool driving disk radially outward with respect of the line of contact of the driving wheel 32, thus automatically diminishing the rated revolutions of the spool and maintaining a constant take up rate of the conveyor. Fig. 2 shows, at its upper end, a conveyor set and the winding up of strips in order, while at the opposite end a receiving spool is shown almost completely wound up.

The downcoming strips from the cutting machine may be deposited upon the table in any appropriate manner; an automatic take off is sometimes used, or the strips may be manually handled, or slide from the knife cut-off by gravity on a suitable tray. The clutches shown in the transmission line shafting to either winding spool are suitably located so that a single operator may control both spools.

From the foregoing it will be seen that this invention provides an economical and efficient means for performing the operations involved, and it is particularly pointed out that the means for shifting the winding speed of the take-up are such as will not, in any way, interfere with the smooth spooling of the sticky strips.

I claim:

1. A spooling device consisting of a table having a moving conveyor thereon; an idler conveyor supply spool having a friction brake thereon; a wind-up spool adapted to reel thereon the said conveyor; primary driving means for said spool adapted to be initially regulated; secondary driving means for rotating the receiving spool, comprising a friction disk on the spool and a friction driving wheel contacting with the disk; a speed control device on the table adapted to move the spool and disk with respect of the radial line of contact of the wheel with the disk as the conveyor is wound upon the spool whereby the speed of the conveyor along the table is uniformly maintained.

2. In a device of the character described the combination with a table having a pair of conveyors thereon adapted to move at an automatically controlled uniform speed toward opposed ends of the table; of counterpart receiving and supply spools, said receiving spools being driven in opposite directions by a common power source and having clutch means for selectively operating them alternately or simultaneously, a change speed device associated with the receiving spools, consisting of slidable friction disks and a surface contact roll on the table adapted to progressively shift the receiving spools as the winding of the conveyor thereon increases their diameter.

3. A spooling device comprising a double-ended table having substantially duplicate and opposed mechanisms, each comprising; a power driven wind-up spool; a friction-retarded stock spool; a conveyor cloth adapted to unwind from the stock spool and be rewound upon the wind-up spool; a slot in the table through which the conveyor cloth is threaded; driving means for the wind-up spool comprising a friction disk on the spool and a friction wheel on the driving shaft; means for shifting the wind-up spool transversely with respect to the friction wheel, said shifting means comprising a fixed roller on the table adapted to contact with the surface of the wound-up stock on the spool whereby the peripheral velocity of the stock-wound spool is automatically maintained approximately constant; and a primary spool-driving mechanism comprising a speed varying means and selective clutches whereby the wind-up spools may be selectively or simultaneously operated.

4. A spooling device consisting of a table having a moving flexible conveyor thereon; a conveyor supply having a conveyor-tensioning means associated therewith; a wind-up spool adapted to reel in said conveyor; a primary driving means for said wind-up spool adapted to be initially set for any desired spooling velocity; secondary spool-driving means, comprising a friction disk non-rotatably associated with the spool in concentric relation thereto and a friction wheel operably associated with the face of the disk in radially variable relation therewith; a wind-up spool shifter in fixed axial relation with the table adapted to progressively displace the wind-up spool axially in relation to the increment of conveyor stock accumulated thereon, whereby the friction disk on the spool is shifted automatically with relation to the friction wheel and the winding-in rate of said conveyor thus maintained constant.

In testimony whereof I affix my signature.

JULIEN F. CULLEN.